(No Model.)

F. EGGE.
CHUCK.

No. 305,580. Patented Sept. 23, 1884.

Witnesses;

Walter Fowler
W. J. Haviland

Inventor;

Frederick Egge
By Atty.
P. W. Smith

UNITED STATES PATENT OFFICE.

FREDERICK EGGE, OF BRIDGEPORT, CONNECTICUT, ASSIGNOR TO THE SMITH & EGGE MANUFACTURING COMPANY, OF SAME PLACE.

CHUCK.

SPECIFICATION forming part of Letters Patent No. 305,580, dated September 23, 1884.

Application filed May 25, 1882. Renewed June 11, 1884. (No model.)

*To all whom it may concern:*

Be it known that I, FREDERICK EGGE, a citizen of the United States, residing at Bridgeport, in the county of Fairfield and State of Connecticut, have invented certain new and useful Improvements in Chucks, of which the following is a specification, reference being had therein to the accompanying drawings.

My invention relates to chucks for drilling purposes, and has for its object to do away with the unnecessary friction common to devices of this class; and with this end in view my invention consists in the details of construction and combination of elements hereinafter fully described, and then specifically designated in the claims.

In order that those skilled may more fully understand the construction and operation of my improved chuck, I will proceed to describe the same in detail, referring by letter to the accompanying drawings, forming part of this specification, in which—

Figure 1:
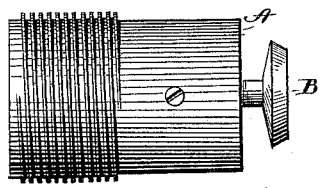
Figure 2:
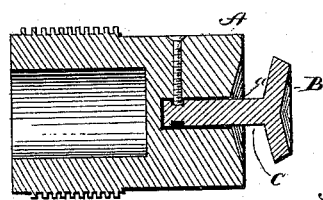
Figure 3:
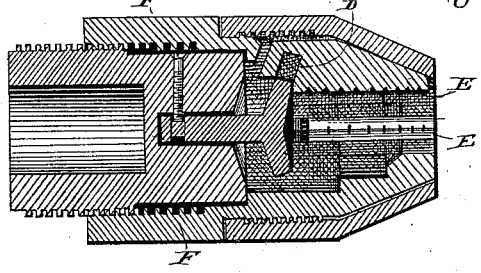

Figure 1 is a perspective view of the chuck cylinder or barrel; Fig. 2, a central vertical section of the same; Fig. 3, a central vertical longitudinal section of the chuck with the sleeve and nose attached in their proper position, and Fig. 4 a modification showing a different way of swiveling the disk.

Similar letters denote like parts in the several figures.

A is the barrel or cylinder of the chuck, and B an abutting disk provided with a spindle, C. This spindle is inserted in an opening, $a$, in the chuck-barrel, and swiveled in any well-known way, all of which will be readily understood by reference to Fig. 2.

Figure 4:
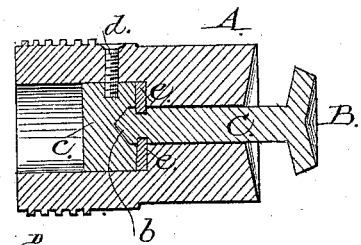

As seen at Fig. 4, the spindle may be beveled to a central point, $b$, which bears against a plug, $c$, driven in at the rear of the chuck-barrel and held in position by the screw $d$. In this latter case I swivel the spindle by dropping pieces of metal, $e$, (preferably sections of an ordinary washer,) into the chuck-barrel, and they readily adapt themselves into the swivel-bearing around said spindle, the plug $c$ keeping them in position. I preferably incline the surfaces of the disk B, and incline the slot D in the jaws E to a pitch corresponding with said inclined disk. The jaws E are of any ordinary shape, provided with a flange at their upper surfaces, which keeps them in a normal position in the chuck-frame F. The jaws may be placed in position within the frame before or after the abutting disk B is in position to engage with the slots D in said jaws, since the latter, as previously set forth, assume a normal position, and the disk will, if driven forward, engage with said slots, all of which will be more readily understood by reference to Fig. 3.

In assembling the parts of my improved chuck, I first swivel (as hereinbefore shown) the abutting disk B to the cylinder or barrel A. I then screw the latter within the chuck-frame F, the jaws being placed in position, as previously shown.

When the slots in the jaws engage with the abutting disk, as the latter moves forward, said disk becomes stationary with the jaws in respect to all rotary motion, and this of course is due to the fact that the rotation of the chuck-barrel A cannot affect the swiveled disk B on account of the slight excess of friction arising from the contact of the jaws with said disk over that at the swiveled bearing. The advantage thereby accruing is obvious from the fact that all the unnecessary friction generating between the otherwise rapidly-revolving disk and the slots in the jaws is done away with, and as a result the compressing of said jaws around a drill and the like is accomplished with great ease, while at the same time the action of the jaws is more positive.

I have shown in my drawings a beveled disk and inclined slot in the jaws; but I do not wish to confine myself to or claim any such construction, as the objective point of my invention may be equally as well attained by using a plain disk and slot.

It is obvious that the disk may be swiveled otherwise than as shown—as, for instance, by making the spindle C in one piece with the chuck-barrel and attaching the disk at the end of said spindle in any manner which would allow it to rotate freely.

Having thus described my invention, what I claim as new, and desire to secure by Letters Patent, is—

1. In a chuck for drilling purposes, the swiveled abutment or disk B, in combination with the jaws E, substantially as set forth.

2. The chuck-barrel A, having an opening, $a$, at its forward end, in combination with the disk B, having spindle C, the latter secured within said opening by a swivel-connection, substantially as hereinbefore described and set forth.

In testimony whereof I affix my signature in presence of two witnesses.

FREDERICK EGGE.

Witnesses:
JOSEPH A. JOYCE,
W. T. HAVILAND.